(12) United States Patent
McCollom

(10) Patent No.: US 8,998,170 B2
(45) Date of Patent: Apr. 7, 2015

(54) ADAPTER FOR A CAPLESS FUEL TANK FILLER NECK TO TEST A FUEL TANK FOR LEAKS

(71) Applicant: Gregory Michael McCollom, Anaheim Hills, CA (US)

(72) Inventor: Gregory Michael McCollom, Anaheim Hills, CA (US)

(73) Assignee: STAR EnviroTech, Inc., Huntington Beach, CA (US)

( * ) Notice: Subject to any disclaimer, the term of this patent is extended or adjusted under 35 U.S.C. 154(b) by 210 days.

(21) Appl. No.: 13/707,798

(22) Filed: Dec. 7, 2012

(65) Prior Publication Data

US 2014/0159360 A1 Jun. 12, 2014

(51) Int. Cl.
*F16L 37/28* (2006.01)
*F16L 3/04* (2006.01)
*G01M 3/04* (2006.01)
*F16L 55/132* (2006.01)

(52) U.S. Cl.
CPC .................................... *F16L 55/132* (2013.01)

(58) Field of Classification Search
CPC ....................................................... F16L 17/02
USPC ........ 251/149, 149.2; 73/49.7, 40.7; 277/934, 277/605, 645–646, 626–627, 602; 285/139.1, 139.2, 139.3, 140.1, 141.1, 285/143.3
See application file for complete search history.

(56) References Cited

U.S. PATENT DOCUMENTS

| | | | | |
|---|---|---|---|---|
| 966,748 A * | 8/1910 | Honecker | ...................... | 285/338 |
| 1,030,306 A * | 6/1912 | Hull | ........................... | 285/139.2 |
| 2,714,898 A * | 8/1955 | Reese | ............................ | 137/799 |
| 2,985,291 A * | 5/1961 | Adolf et al. | .................... | 277/650 |
| 3,845,792 A * | 11/1974 | Johnson | .......................... | 141/46 |
| 3,898,163 A * | 8/1975 | Mott | ............................... | 210/246 |
| 3,911,977 A * | 10/1975 | Berger | .......................... | 141/348 |
| 3,923,314 A * | 12/1975 | Lawler et al. | ................. | 277/606 |
| 4,098,308 A * | 7/1978 | Purdum | ........................ | 141/285 |
| 4,230,325 A * | 10/1980 | Butler et al. | .................... | 277/622 |
| 4,809,751 A * | 3/1989 | McKenzie | ....................... | 138/89 |
| 4,810,832 A * | 3/1989 | Spinner et al. | ................. | 174/654 |
| 4,881,655 A * | 11/1989 | Jansky et al. | ............. | 220/203.18 |
| 5,099,825 A * | 3/1992 | Massey et al. | ............. | 122/13.01 |
| 5,111,879 A * | 5/1992 | Jozwiak et al. | .............. | 166/93.1 |
| 5,369,984 A * | 12/1994 | Rogers et al. | .................. | 73/49.2 |
| 5,425,266 A * | 6/1995 | Fournier | ......................... | 73/49.7 |
| 5,507,176 A * | 4/1996 | Kammeraad et al. | .......... | 73/49.2 |
| 6,044,864 A * | 4/2000 | Maier | ............................ | 137/588 |
| 6,059,294 A * | 5/2000 | Gorce | ............................ | 277/630 |
| 6,095,207 A * | 8/2000 | Enders | .......................... | 141/348 |
| 6,318,155 B1 * | 11/2001 | Carr | ................................ | 73/49.7 |
| 6,691,750 B1 * | 2/2004 | Foltz | ............................. | 141/350 |
| 6,755,057 B2 * | 6/2004 | Foltz | ................................ | 70/159 |
| 7,882,862 B2 * | 2/2011 | DeCapua et al. | ............. | 141/295 |

(Continued)

*Primary Examiner* — John K Fristoe, Jr.
*Assistant Examiner* — David Colon Morales
(74) *Attorney, Agent, or Firm* — Morland C. Fischer

(57) ABSTRACT

A filler neck adapter to be inserted through the open fuel mouth of a capless filler neck of a fuel tank of a motor vehicle. The adapter has a hollow flow body to create a continuous flow path between a source of pressure or vacuum and the fuel tank to enable the fuel tank to be tested for leaks. A resilient seal surrounds the flow body of the adapter so as to lie between movable and stationary seal stops. A force-generating member is moved along the flow body to push the movable seal stop and the seal towards the stationary seal stop. Accordingly, the seal is compressed between the movable and stationary seal stops so as to bulge outwardly towards and thereby create an air-tight seal against the fuel mouth of the filler neck.

18 Claims, 2 Drawing Sheets

(56) References Cited

U.S. PATENT DOCUMENTS

| | | | |
|---|---|---|---|
| 2007/0204675 A1* | 9/2007 | Herzog et al. | 73/37 |
| 2009/0139606 A1* | 6/2009 | Peddle et al. | 141/350 |
| 2010/0193076 A1* | 8/2010 | Walkowski et al. | 141/348 |
| 2010/0326567 A1* | 12/2010 | McCollom | 141/368 |

\* cited by examiner

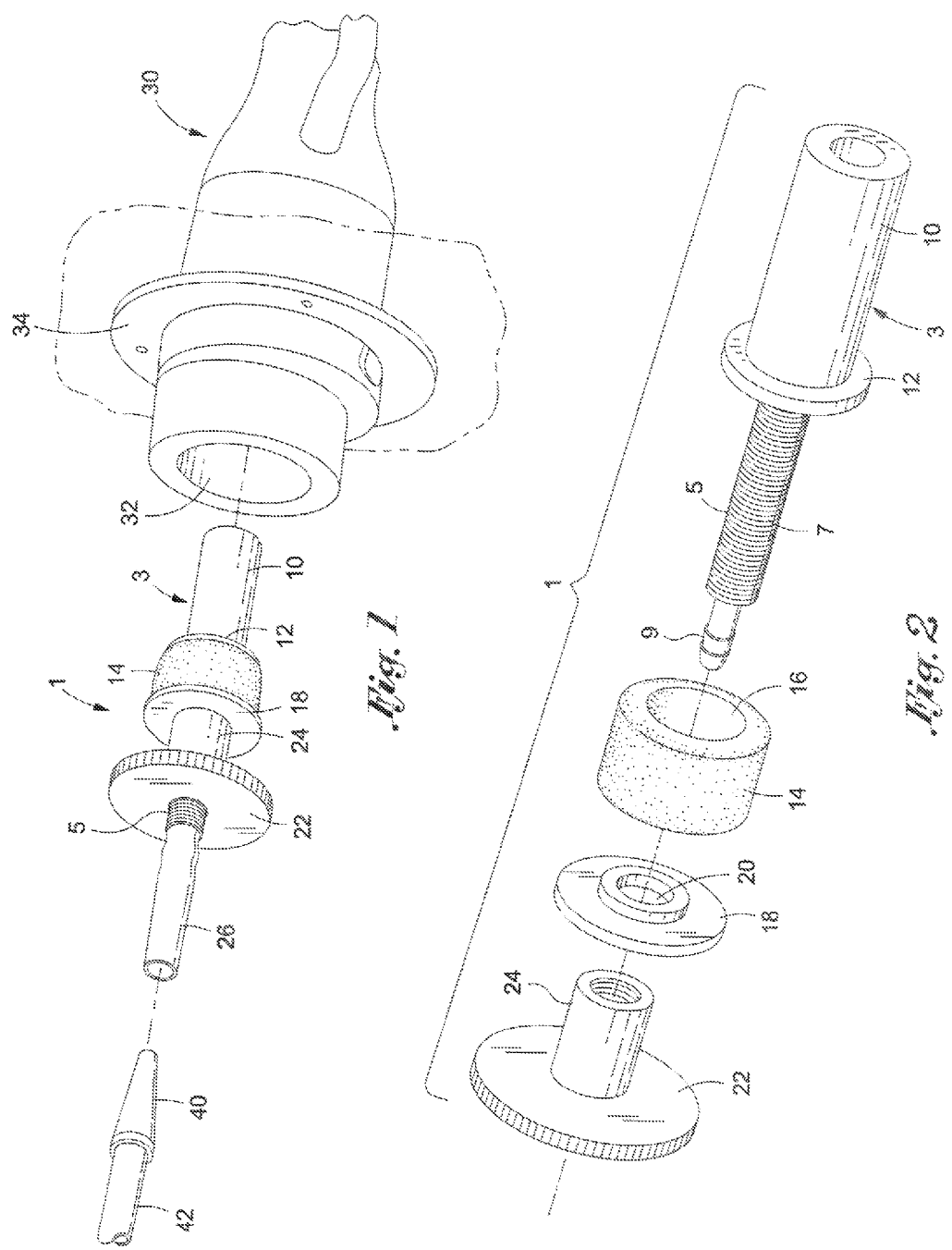

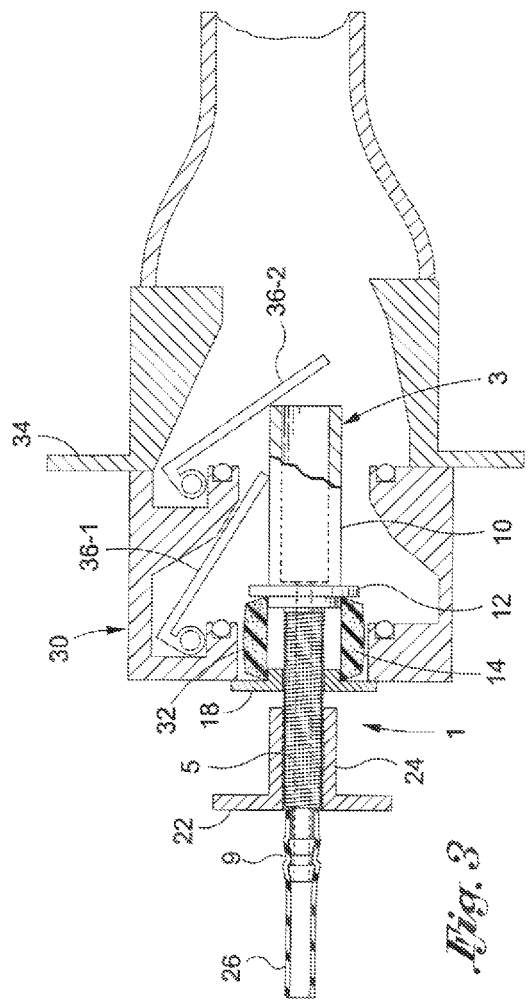
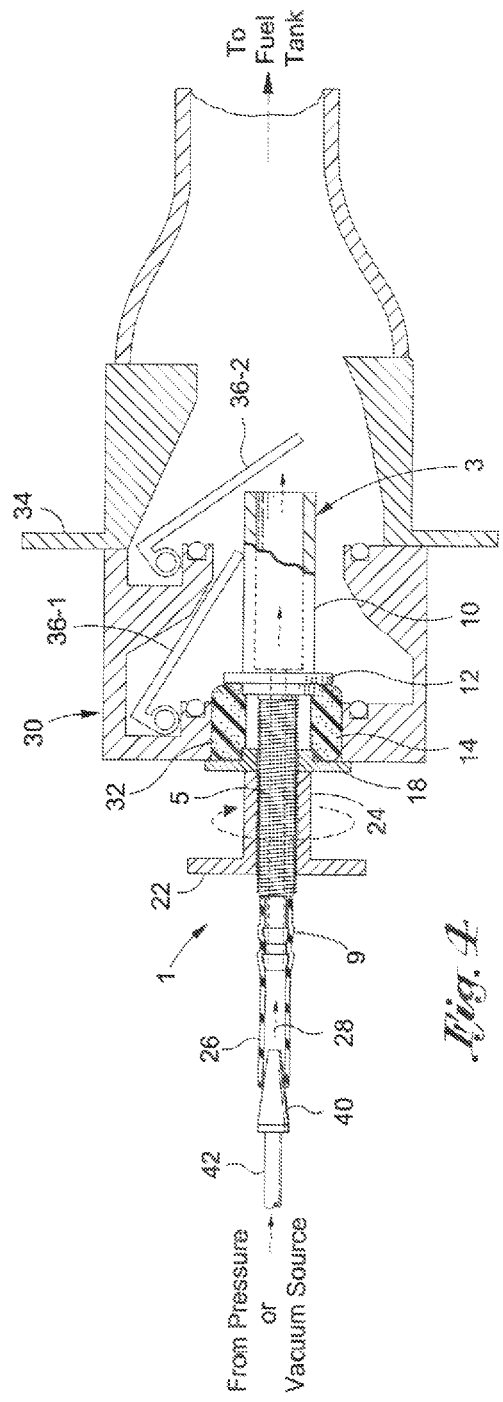

ADAPTER FOR A CAPLESS FUEL TANK FILLER NECK TO TEST A FUEL TANK FOR LEAKS

BACKGROUND OF THE INVENTION

1. Field of the Invention

This invention relates to a filler neck adapter to be removably attached to a capless fuel tank filler neck of a motor vehicle so that a source of pressure (e.g., a vapor) or a source of vacuum can be coupled to the fuel tank of the vehicle by way of the filler neck adapter and the filler neck to enable the fuel tank to be tested for leaks.

2. Background Art

Fuel tanks, vapor lines and components associated therewith of a motor vehicle are known to experience cracks, holes and fissures for a variety of reasons. By way of a first example, a rock or another object encountered along the roadway may strike the feel tank while the vehicle is in motion. By way of another example, normal wear and tear and/or the caustic effects of gasoline may, over time, cause the fuel tank, vapor lines and components to degrade. In either case, because the damage caused to the fuel tank is typically very small, such damage is often difficult to detect and locate to enable repairs to be made. The result of not being able to accurately locate and repair the damage is that fuel fluid and/or vapor may leak from the fuel tank, vapor lines or components, whereby the environment is exposed to toxic fumes.

It has been known to generate and deliver a visible vapor (sometimes known as "smoke") to a closed fluid system in order to detect the presence and location of leaks by visually inspecting the system for any vapor escaping therefrom. In this regard, vapor can be delivered to a fuel tank by way of the fuel tank filler neck in order to pressurize the fuel tank to be tested for leaks. However, in the case of a capless fuel tank filler neck, it has proven to be difficult to reliably couple a source of pressure to the throat of the filler neck. It has also proven to be difficult to adequately maintain the pressure in the tank to enable a pressure test to be completed. That is, because of its construction, pressure has been known to leak from the fuel tank as a consequence of inadequate sealing between the pressure source and the filler neck.

What would therefore be desirable is a low-cost, easy to install, and reusable adapter by which a pressure or vacuum source can be efficiently and reliably coupled to a capless fuel tank filler neck of the fuel tank of a motor vehicle so that the fuel tank can be tested for leaks. Reference may be made to my co-pending patent application Ser. No. 12/459,274 for one example of an insert which can be used to test a fuel tank for leaks.

SUMMARY OF THE INVENTION

In general terms, an adapter is disclosed to be removably attached to a capless fuel tank filler neck of a fuel tank of a motor vehicle so that the fuel tank, its vapor lines and components can all be tested for leaks. By virtue of the foregoing, a source of pressure or a source of vacuum can be coupled to the fuel tank by way of the adapter and the filler neck. In the case where a pressure source is to be coupled, to the fuel tank, a supply of vapor (e.g., sometimes known as "smoke") can be used to pressurize the fuel tank so that a pressure-decay test can be performed or the fuel tank visually monitored for smoke escaping therefrom. In the case where a vacuum source is to be coupled to the fuel tank, a vacuum is created in the tank so that a vacuum-decay test can be performed.

The filler neck adapter includes a hollow flow body that is moved through the open fuel mouth of the capless fuel tank filler neck to create a continuous flow path between the pressure or vacuum source and the tank of the vehicle to be tested. A set of screw threads is formed around a proximal end of the flow body, and a door control cylinder is formed at die opposite distal end thereof and sized for receipt down the throat of the filler neck so as to displace one or more spring-biased, normally closed doors in order to permit access to the fuel tank. A stationary first seal stop surrounds the flow body of the adapter at the interface of the proximal and distal ends. A movable second seal stop surrounds the threaded proximal end of the flow body. A resilient filler neck seal also surrounds the threaded end of the flow body so as to lie between the stationary first and the movable second seal stops. A threaded force-generating sleeve of a disk-like force control member is coupled in surrounding engagement to the threaded end of the flow body.

When the filler neck adapter is attached to the capless fuel tank filler neck, the filler neck seal is positioned between the flow body and the open fuel mouth of the filler neck. The source of pressure or vacuum is connected to the proximal threaded end of the flow body. A rotational force is then applied to the force control member to cause the force-generating sleeve to rotate around and move axially along the threaded end of the flow body towards the movable seal stop. Accordingly, the force-generating sleeve pushes the movable seal stop and the resilient filler neck seal along the threaded end of the flow body into engagement with the stationary seal stop, whereby the resilient seal, is sandwiched and compressed between the seal stops. The seal is thusly deformed so as to bulge outwardly towards and create an air-tight seal against the fuel mouth of the filler neck to enable the fuel tank to hold its pressure or vacuum from the source thereof for the duration of the leak testing.

BRIEF DESCRIPTION OF THE DRAWINGS

FIG. 1 is a perspective view of an adapter according to a preferred embodiment of this invention to be removably attached to a capless fuel tank filler neck of a fuel tank of a motor vehicle so that a source of pressure or a source of vacuum can be connected to the fuel tank to enable the fuel tank, its vapor lines and components to be tested for leaks;

FIG. 2 is an exploded view of filler neck adapter of FIG. 1;

FIG. 3 is a cross-section of the filler neck adapter inserted through the open fuel mouth and down the throat of the capless fuel tank filler neck so as to engage and displace a pair of spring-biased, normally closed doors to permit access to the fuel tank; and FIG. 4 shows the filler neck adapter of FIG. 3 with a resilient filler neck seal thereof being compressed and deformed to create an air-tight seal against the fuel mouth of the filler neck so that the fuel tank will be able to maintain its pressure or vacuum for the duration of the leak testing.

DESCRIPTION OF THE PREFERRED EMBODIMENT

A low cost, easy to install filler neck adapter 1 to be inserted within a capless filler neck 30 of a fuel tank of a motor vehicle is described while initially referring to FIGS. 1 and 2 of the drawings. The adapter 1 is preferably manufactured from aluminum or a similar non-corrosive material. As will be described in greater detail while referring to FIGS. 3 and 4, the filler neck adapter 1 is removably attached to the filler neck 30 to create a flow path therethrough by which a source of pressure or a source of vacuum is coupled to the fuel tank by way of the fuel tank filler neck. By virtue of the foregoing, the fuel tank can be tested for leaks by means of a conventional pressure test, a vacuum decay test, or any other suitable test. By way of example, where the adapter 1 is used to couple a source of pressure to the fuel tank, a supply of gas (i.e., a vapor sometimes referred to as "smoke") can be introduced to the filler neck 30 to identify the presence and location of a leak in the fuel tank itself as well as the vapor lines and components thereof while pressure is maintained throughout the test process.

According to a preferred embodiment, the fuel tank filler neck adapter 1 includes a hollow flow body 3 through which a gas under pressure is supplied to or a vacuum is drawn from the vehicle fuel tank by way of the fuel tank filter neck 30. The proximal end of the flow body 3 is a relatively narrow shaft 5 (best shown in FIG. 2) having a series of screw threads 7 running therearound. A hollow barbed hose coupler 9 (also best shown in FIG. 2) projects from the threaded shaft 5 of the flow body 3 to facilitate the connection of the filler neck adapter 1 to the source of pressure or vacuum. The opposite distal end of the flow body 3 is a relatively wide filler neck door control cylinder 10 that is sized to be received through the open fuel mouth 32 and down the throat of the capless fuel tank filler neck 30.

A continuous flow path (designated 28 in FIG. 4) is established through the hollow flow body 3 of the filler neck adapter 1 via the barbed hose coupler 9, the proximal threaded shaft 5, and the distal filler neck door control cylinder 10 thereof. An integral (i.e., stationary) lower seal stop 12 surrounds the flow body 3 at the intersection of the threaded proximal shaft 5 and the distal filler neck door control cylinder 10.

As an important feature of this invention, the filler neck adapter 1 includes a cylindrical filler neck seal 14 having a central opening 16. The filler neck seal 14 is manufactured from a resilient and fuel-resistant material (e.g., a rubber, such as that known commercially as Viton®) which is responsive to a compressive force to cause a deformation of the seal 14 and a corresponding change in the seal dimensions (i.e., thickness). The central opening 16 is sized to enable the filler neck seal 14 to surround and slide over the threaded shaft 5 of the (low body 3 so as to lie in face-to-face engagement against the stationary lower seal stop 12.

The filler neck adapter 1 also includes a movable disk-like upper seal stop 18 having a central opening 20. The central opening 20 is sized to enable the upper seal stop 18 to surround and slide over the threaded shaft 5 of the flow body 3 so as to lie in face-to-face engagement against the filler neck seal 14. Thus, in the assembled configuration of the filler neck adapter 1 shown in FIG. 1, and as will soon be explained, the resilient filler neck seal 14 can be sandwiched between the lower and upper seal stops 12 and 18, whereby the seal 14 is held in surrounding coaxial alignment with the threaded proximal shaft 5 of the body 3 of the filler neck adapter 1.

A movable disk-like force control member 22 is coupled to the flow body 3 so as to create a variable compressive force to be delivered to the filler neck seal 14 when the seal is sandwiched between the lower and upper seat stops 12 and 18. The force control member 22 has a threaded force-generating sleeve 24 extending therefrom and sized to surround the threaded shaft 5 of the adapter body 3. The threaded force-generating sleeve 24 is adapted to be rotated around and moved axially along the threaded shaft 5 in response to a rotational force applied to the force control member 22. That is, a rotation of the disk-like force control member 22 causes the threaded force-generating sleeve 24 thereof to ride over and along the threaded shall 5 so as to move either closer to or away from the upper seal stop 18 which surrounds the shaft 5 depending upon the direction in which the force control member 22 is rotated.

With, the filler neck adapter 1 in its assembled configuration shown in FIG. 1, one end of a (e.g., rubber) inlet tube 26 is pushed into frictional surrounding engagement with the barbed tube coupler 9 extending from the threaded shaft 5 of the flow body 3. The opposite end of the inlet tube 26 is adapted to be engaged by a nozzle 40 that is attached to a pressure/vacuum supply hose 42. As will now be explained while referring to FIGS. 3 and 4 of the drawings, the pressure/vacuum supply hose 44 is coupled to a source of pressure or to a source of vacuum. Therefore, a vapor (i.e., "smoke") can be delivered under pressure to or a vacuum can be created within the fuel, tank and its associated vapor lines by way of the continuous flow path (28 in FIG. 4) that is established through the filler neck adapter 1 between the pressure or vacuum source and the capless filler neck 30 of the fuel tank.

FIG. 3 shows the filler neck adapter 1 according to the preferred embodiment described above attached to the capless fuel tank filler neck 30 which is affixed to the chassis of a motor vehicle fey means of a filler neck mounting ring 34. It can be appreciated that a pressure or a vacuum is delivered directly to the filler neck adapter 1 without any intermediate coupler located between the adapter and the pressure or vacuum source. In the case of FIGS. 3 and 4, the capless filler neck 30 to which the filler neck adapter 1 is to be attached is of the double-door type. That is to say, a pair of normally closed, spring-biased doors 36-1 and 36-2 are hingedly connected one above the other to extend across the filler neck 30 and thereby close the fuel month 32 thereof. Therefore, the length of the distal filler neck door control cylinder 10 of the flow body 3 must be sufficiently long to be received through the fuel mouth 32 of the filler neck 30 and reach both of the doors 36-1 and 36-1. However, it is to be expressly understood that by simply shortening the door control cylinder 10, the filler neck adapter 1 of this invention can be attached to a single door capless filler neck.

Once the filler neck adapter 1 is attached to the filler neck 30, and referring specifically now to FIG. 4, the fuel tank can be tested for leaks. More particularly, the filler neck door control cylinder 10 of the flow body 3 is inserted through the fuel mouth 32 and down the throat of the filler neck 30 such that the resilient filler neck seal 14 is located within the fuel month. The filler neck door control cylinder 10 applies a pushing force against each of the spring-biased doors 36-1 and 36-2 by which to cause the doors to rotate so as to open the filler neck 30 and thereby permit the fuel tank and its feel lines to be coupled to the source of pressure or vacuum by way of the filler neck adapter 1.

Initially, no compressive force is applied to the filler neck seal 14 which is relaxed between the lower and upper seal stops 12 and 18. In order to create a reliable air-tight seal between the adapter 1 and the fuel mouth 32 of the filler neck 30 during the leak testing, the disk-like force control member 22 is rotated in a first (e.g., clockwise) direction around to the threaded shaft 5 of the flow body 3. A rotation of the force control member 22 causes the threaded force-generating sleeve 24 thereof to correspondingly rotate around and move axially along the threaded shaft 5 towards the upper seal stop 18. The force control member 22 is rotated so that the force-generating sleeve 24 is moved into contact with and pushes the upper seal stop 18 as well as the seal 14 along the threaded shaft 5 towards the lower seal stop 12. Accordingly, the resilient filler neck seal 14 that surrounds the shaft 5 will now be sandwiched and compressed between the stationary and moving lower and upper seal stops 12 and 18. The cylindrical filler neck seal 14 is thusly deformed and flattened so as to bulge radially outward towards and against the open feel mouth 32 in response to the compressive squeezing force applied thereto. The outwardly bulging filler neck seal 14 fills and closes the fuel mouth 32 of the filler neck 30 to advantageously enable the fuel tank to hold its pressure or vacuum for the duration of the leak testing.

As was earlier explained, one method by which to test the fuel tank for leaks is to use a vapor (i.e., "smoke") to pressurize the tank. Such a vapor can be created by heating a liquid petroleum to convert, the liquid to a visible vapor. Reference may be made to U.S. Pat. Nos. 6,142,009; 6,526,808 and 6,477,890 for examples of a smoke generator to create the vapor necessary to fill and pressurize the fuel tank undergoing testing. In this case, the pressure/vacuum supply hose 42 and the nozzle 40 receive a supply of visible smoke, under pressure, from the smoke generator. The vapor is delivered from nozzle 40 to the fuel tank under test by way of a continuous vapor delivery path 28 through the hollow flow body 3 of die filler neck adapter 1. Once it is pressurized, the fuel tank (and its fuel lines and components) is monitored for leaks by conventional testing methods such as, for example, by visually looking for the escape of smoke from a leak or by performing a mechanical pressure-decay test.

Rather than pressurizing the fuel tank with a vapor, as just, described, any other source of suitable gas (e.g., air or nitrogen) can be supplied to the flow body 3 of the adapter 1 to fill the fuel tank. The gas will pressurize the fuel tank to enable leaks to be detected by means of a conventional pressure decay test or the like. As was also explained, a source of vacuum can be used in place of the aforementioned vapor/gas pressure source to be connected to the adapter body 3. In this case, a suction path will be established from the fuel tank to the vacuum source via the filler neck 30, the flow body 3, the nozzle 40, and the pressure/vacuum, supply hose 42 in order to enable leaks to be detected by means of a conventional vacuum decay test or the like. Reference may be made to U.S. Pat. No. 7,387,014 for an example of a suitable vacuum-generating device.

At the conclusion of the leak testing process, the nozzle 42 is detached from the inlet tube 26 of the flow body 3. The force control member 22 is then, rotated in an opposite (i.e., counter-clockwise) direction around the threaded shaft 5 to cause the force-generating sleeve 24 thereof to ride over the threaded shaft 5 and move away from the filler neck seal 14. The resilient seal 14 which had been compressed and flattened between the stationary and movable lower and upper seal stops 12 and 18 will now be able to return to its initial relaxed configuration. Accordingly, the former air-tight seal created between the filler neck seal 14 and the fuel mouth 32 of the capless filler neck 30 will be broken to permit the filler neck adapter 1 to be withdrawn from the filler neck. With the adapter 1 withdrawn from the filler neck 30, the spring-biased doors 36-1 and 36-2 will automatically rotate to their normally closed, position extending across the throat of the filler neck 30.

The invention claimed is:

1. An adapter for a capless fuel tank filler neck of a motor vehicle by which fuel is delivered to a fuel tank of the motor vehicle, where the fuel tank filler neck has an open fuel mouth through which the fuel flows to the fuel tank, and where the fuel tank filler neck also has a closure positioned thereacross to block access to the fuel tank, said adapter to be removably attached to the fuel tank filler neck by which to couple a source of pressure or a source of vacuum to the fuel tank so that the fuel tank can be tested for leaks, said adapter comprising a hollow flow body including first and opposite ends, the first end of said flow body having a set of screw threads and the opposite end of said flow body being inserted into the open fuel mouth and extending through the filler neck when said adapter is attached to the filler neck, the opposite end of said flow body having a length sufficient to engage and displace the closure positioned across the filler neck so as to permit access to the fuel tank, said adapter also comprising a seal surrounding said flow body such that said seal lies between said flow body and the fuel mouth of the fuel tank filler neck when said flow body is inserted into the fuel mouth, said seal being responsive to a force applied thereto whereby to cause said seal to be deformed and thereby move into air-tight sealing engagement with the fuel mouth of the fuel tank filler neck while the fuel tank is being tested for leaks.

2. The adapter recited in claim 1, further comprising a force-generating surface that is adapted to move into engagement with said seal to apply a compressive force thereto, whereby said seal is deformed so as to move into said air-tight sealing engagement with the fuel mouth of the fuel tank filler neck, said force-generating surface moving along the set of screw threads at the first end of said hollow flow body towards said seal.

3. The adapter recited in claim 2, wherein the force-generating surface of said adapter surrounds the first end of said hollow flow body and moves along said first end towards and into engagement with said seal so as to apply the compressive force to said seal.

4. The adapter recited in claim 3, wherein the force-generating surface of said adapter has a threaded opening through which to receive and surround the first end of said hollow flow body, said force-generating surface being responsive to a rotational force applied thereto to cause said force-generating surface to rotate around the set of threads of the first end of said flow body, whereby to cause said force-generating surface to move along said first end towards and into engagement with said seal to apply said compressive force thereto.

5. The adapter recited in claim 4, further comprising a seal stop carried by said hollow flow body, said seal surrounding the first end of said flow body so as to lie between the force-generating surface of said adapter and said seal stop, said force-generating surface moving along said first end and into said engagement with said seal such that said seal is compressed between said force-generating surface and said seal stop so as to be deformed and moved into said air-tight sealing engagement with the fuel mouth of the fuel tank filler neck.

6. The adapter recited in claim 5, wherein said seal is manufactured from a resilient material such that when said seal is compressed and deformed, said seal bulges towards and into said air-tight sealing engagement with the fuel mouth.

7. The adapter recited in claim 4, further comprising first and second seal stops surrounding said hollow flow body, said seal surrounding the first end of said flow body so as to lie between said first and second seal stops, the force-generating surface of said adapter moving along said first end and into contact with a first of said first and second seal stops to push the first seal stop and said seal along said first end towards said second seal stop, such that said seal is compressed between said first and second seal stops to cause said seal to be deformed and thereby move into said air-tight sealing engagement with the fuel mouth of the fuel tank filler neck.

8. The adapter recited in claim 7, wherein said seal is manufactured from a resilient material such that said seal is deformed and bulges towards and into said air-tight sealing engagement with the fuel mouth when said seal is compressed between said first and second seal stops.

9. The adapter recited in claim 7, wherein said first seal stop has an opening through which to receive and surround the first end of said hollow flow body so that said first seal stop is pushed with said seal by the force-generating surface of said adapter along said first end and towards the second seal stop, such that said seal is compressed between said first and second seal stops.

10. The adapter recited in claim 9, wherein said second seal stop is fixedly attached in surrounding engagement with said hollow flow body such that said first seal stop and said seal move along the first end of said flow body relative to said second seal stop.

11. The adapter recited in claim 1, wherein the hollow flow body of said adapter creates a continuous flow path from the source of pressure or the source of vacuum to the fuel tank.

12. A combination including a capless fuel tank filler neck of a motor vehicle by which fuel is delivered to a fuel tank of the motor vehicle, where the fuel tank filler neck has an open fuel mouth through which the fuel flows to the fuel tank, and where the fuel tank filler neck also has a pair of movable closure doors that are initially positioned thereacross and lying one after another along said fuel tank filler neck to block access to the fuel tank, and an adapter to be removably attached to the fuel tank filler neck by which to couple a source of pressure or a source of vacuum to the fuel tank so that the fuel tank can be tested for leaks, said adapter comprising:
   a hollow flow body to be inserted through the open fuel mouth and down the filler neck when said adapter is attached to the filler neck, said flow body including first and opposite ends, the first end of said flow body having a set of screw threads and the opposite end of said flow body being inserted through the filler neck and having a length sufficient to engage and displace each one of said pair of movable closure doors initially positioned across the filler neck so as to permit access to the fuel tank;
   a seal surrounding said flow body so as to lie between said flow body and the fuel mouth of the fuel tank filler neck when said flow body is inserted through the fuel mouth;
   a stationary first seal stop surrounding said flow body, said seal lying against said first seal stop; and
   a force-generating surface surrounding said flow body and moving along the set of screw threads at the first end of said flow body towards said stationary first seal stop such that said seal is compressed between said force-generating surface and said first seal stop to cause said seal to be deformed and thereby create an air-tight seal against the fuel mouth of the fuel tank filler neck while the fuel tank is being tested for leaks.

13. The combination recited in claim 12, wherein the force-generating surface of said adapter has a threaded opening through which to receive and surround the set of screw threads at the first end of said flow body, said force-generating surface being responsive to a rotational force applied thereto to cause said force-generating surface to rotate around the set of threads and move along the first end of said flow body towards said stationary first seal stop such that said seal is compressed between said force-generating surface and said stationary first seal stop.

14. The combination recited in claim 13, wherein said seal is manufactured from a resilient material such that said seal is deformed and bulges towards the fuel mouth of the fuel tank filler neck so as to create said air-tight seal thereagainst when said seal is compressed between said force-generating surface and said stationary first seal stop.

15. The combination recited in claim 12, further comprising a movable second seal stop surrounding the set of screw threads at the first end of the hollow flow body of said adapter, said seal surrounding said flow body so as to lie between said stationary first and said movable second seal stops, the force-generating surface of said adapter moving along the set of screw threads at the first end of said flow body so as to engage and push said movable second seal stop and said seal along said flow body towards said stationary first seal stop, such that said seal is compressed between said first and second seal stops to cause said seal to be deformed and thereby create said air-tight seal against the fuel mouth of the fuel tank filler neck.

16. The combination recited in claim 15, wherein said seal is manufactured from a resilient material such that said seal is deformed and bulges towards the fuel mouth of the fuel tank filler neck so as to create said air-tight seal thereagainst when said seal is compressed between said first and second seal stops.

17. The combination recited in claim 15, wherein said stationary first seal stop is fixedly attached in surrounding engagement with the hollow flow body of said adapter such that said movable second seal stop and said seal move along said flow body relative to said stationary first seal stop.

18. A combination including a capless fuel tank filler neck of a motor vehicle by which fuel is delivered to a fuel tank of the motor vehicle, where the fuel tank filler neck has an open fuel mouth through which the fuel flows to the fuel tank, and where the fuel tank filler neck also has a pair of movable closure doors that are initially positioned thereacross and lying one after another along said fuel tank filler neck to block access to the fuel tank, and an adapter to be removably attached to the fuel tank filler neck by which to couple a source of pressure or a source of vacuum to the fuel tank so that the fuel tank can be tested for leaks, said adapter comprising:
   a hollow flow body to be inserted through the open fuel mouth and down the filler neck when said adapter is attached to the filler neck, said flow body including first and opposite ends, the first end of said flow body having a set of screw threads and the opposite end of said flow body being inserted through the filler neck and having a length sufficient to engage and displace each one of said pair of movable closure doors initially positioned across the filler neck so as to permit access to the fuel tank;
   a seal surrounding said flow body so as to lie between said flow body and the fuel mouth of the fuel tank filler neck when said flow body is inserted through the fuel mouth;
   a stationary first seal stop surrounding said flow body;
   a movable second seal stop surrounding the set of screw threads at the first end of said flow body and being movable relative to said stationary first seal stop, said seal being located between said stationary first seal stop and said movable second seal stop; and
   a force-generating surface surrounding said flow body and moving along the set of screw threads at the first end of said flow body towards said first and second seal stops so as to push said movable second seal stop and said seal over said flow body towards said stationary first seal stop, whereby said seal is compressed between said first and second seal stops to cause said seal to be deformed and thereby create an air-tight seal against the fuel mouth of the fuel tank filler neck while the fuel tank is being tested for leaks.

* * * * *